United States Patent
Iwai et al.

(10) Patent No.: US 11,719,116 B2
(45) Date of Patent: Aug. 8, 2023

(54) THROTTLE MECHANISM AND TURBINE

(71) Applicant: TOSHIBA ENERGY SYSTEMS & SOLUTIONS CORPORATION, Kawasaki (JP)

(72) Inventors: Shogo Iwai, Tokyo (JP); Takahiro Ono, Tokyo (JP)

(73) Assignee: TOSHIBA ENERGY SYSTEMS & SOLUTIONS CORPORATION, Kawasaki (JP)

(*) Notice: Subject to any disclaimer, the term of this patent is extended or adjusted under 35 U.S.C. 154(b) by 0 days.

(21) Appl. No.: 17/827,205

(22) Filed: May 27, 2022

(65) Prior Publication Data

US 2022/0403789 A1 Dec. 22, 2022

(30) Foreign Application Priority Data

Jun. 16, 2021 (JP) ................. 2021-100321

(51) Int. Cl.
| | |
|---|---|
| *F01D 11/24* | (2006.01) |
| *F01D 5/08* | (2006.01) |
| *F02C 7/18* | (2006.01) |
| *F16K 31/00* | (2006.01) |
| *G05D 23/02* | (2006.01) |
| *F01D 5/18* | (2006.01) |
| *F01D 25/12* | (2006.01) |
| *F02C 9/20* | (2006.01) |
| *F16K 25/00* | (2006.01) |

(52) U.S. Cl.
CPC .............. *F01D 11/24* (2013.01); *F01D 5/081* (2013.01); *F02C 7/18* (2013.01); *F16K 31/002* (2013.01); *G05D 23/025* (2013.01); *F01D 5/082* (2013.01); *F01D 5/084* (2013.01); *F01D 5/187* (2013.01); *F01D 25/12* (2013.01); *F02C 9/20* (2013.01); *F16K 25/005* (2013.01); *G05D 23/02* (2013.01); *G05D 23/022* (2013.01); *G05D 23/024* (2013.01); *Y10T 137/7737* (2015.04)

(58) Field of Classification Search
CPC .......... F01D 11/24; F01D 5/081; F01D 5/082; F01D 5/084; F01D 5/187; F01D 25/12; F02C 7/18; F02C 9/20; F16K 31/002; F16K 25/005; G05D 23/025; G05D 23/02; G05D 23/022; G05D 23/024
See application file for complete search history.

(56) References Cited

U.S. PATENT DOCUMENTS

| | | |
|---|---|---|
| 3,966,354 A | 6/1976 | Patterson |
| 4,805,398 A | 2/1989 | Jourdain et al. |
| 5,022,817 A * | 6/1991 | O'Halloran .......... F01D 5/18 415/115 |

(Continued)

FOREIGN PATENT DOCUMENTS

| | | |
|---|---|---|
| EP | 2 674 593 A2 | 12/2013 |
| WO | WO-2016/143103 A1 | 9/2016 |

*Primary Examiner* — Gerald L Sung
*Assistant Examiner* — Rene D Ford
(74) *Attorney, Agent, or Firm* — Foley & Lardner LLP

(57) ABSTRACT

There are provided a throttle mechanism and the like that are capable of easily changing a cross-sectional area of a flow path according to an operating state. The throttle mechanism in an embodiment is a throttle mechanism that controls a flow rate of a fluid flowing through a flow path, and is configured to make a cross-sectional area of the flow path change autonomously according to temperature.

1 Claim, 18 Drawing Sheets

(56) References Cited

U.S. PATENT DOCUMENTS

| | | | |
|---|---|---|---|
| 7,445,424 B1 | 11/2008 | Ebert et al. | |
| 10,215,501 B1* | 2/2019 | Reist | F28D 21/0014 |
| 2009/0226327 A1* | 9/2009 | Little | F01D 5/082 |
| | | | 416/96 A |
| 2012/0183398 A1 | 7/2012 | Are et al. | |
| 2014/0157791 A1* | 6/2014 | Saha | F01D 17/141 |
| | | | 60/785 |
| 2016/0376890 A1 | 12/2016 | Inomata et al. | |
| 2020/0218293 A1* | 7/2020 | Culler | G05D 23/025 |

* cited by examiner

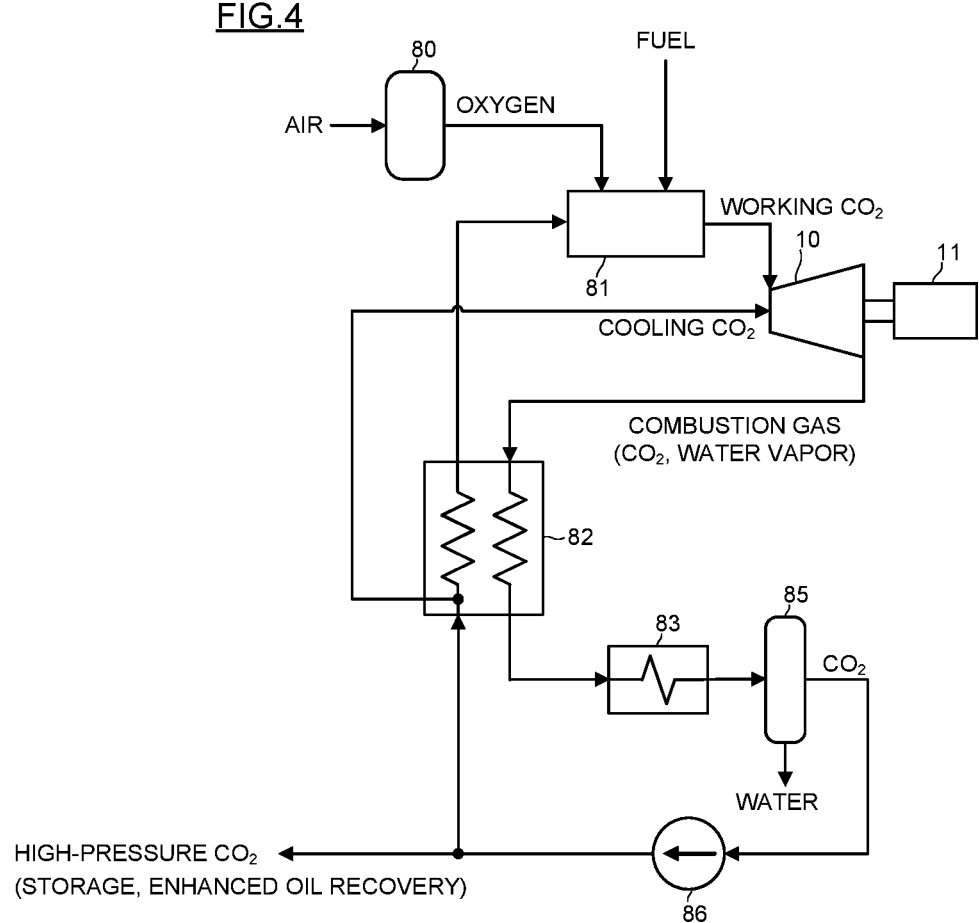

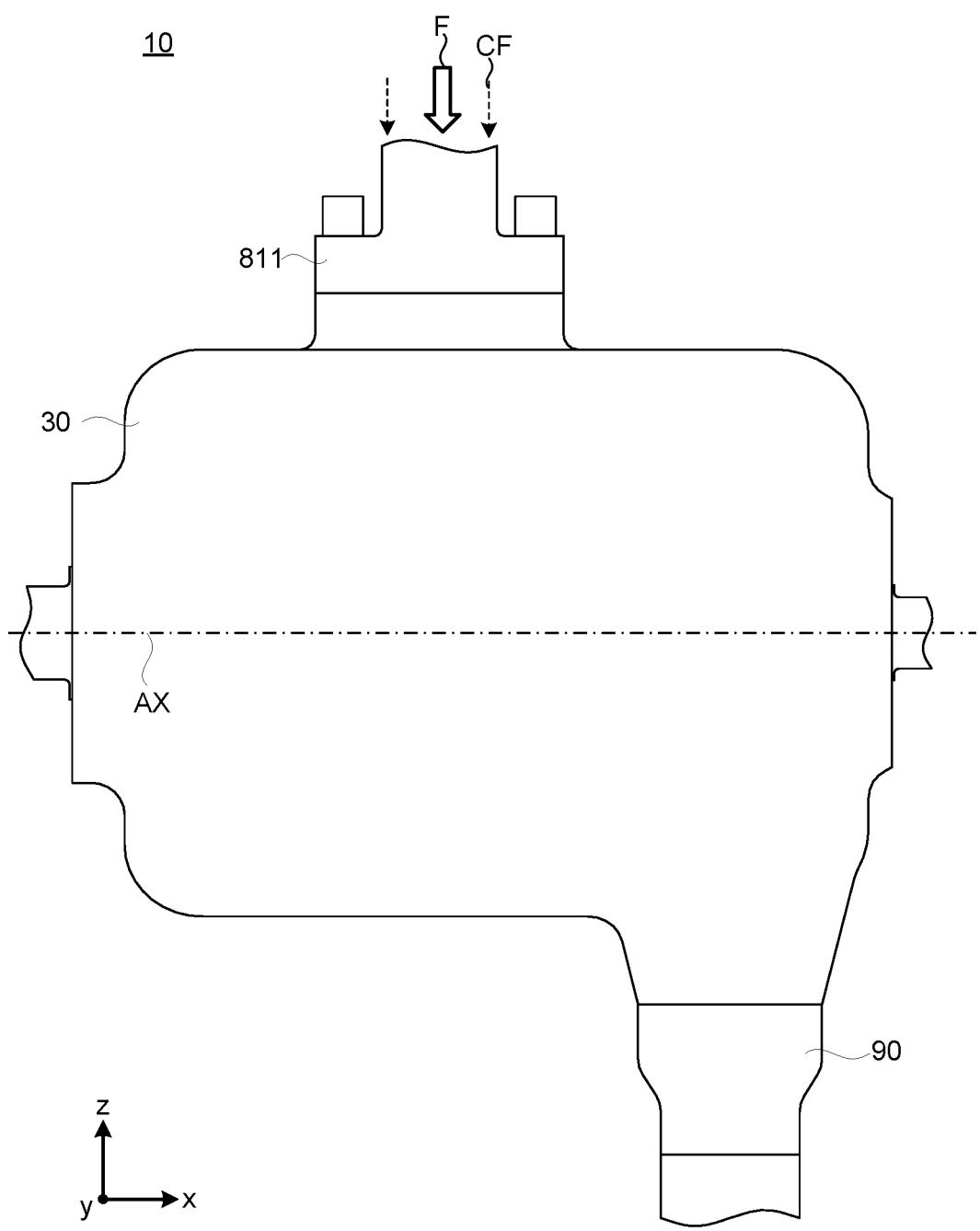

THROTTLE MECHANISM AND TURBINE

CROSS REFERENCE TO RELATED APPLICATIONS

This application is based upon and claims the benefit of priority of the prior Japanese Patent Application No. 2021-100321, filed on Jun. 16, 2021, the entire contents of which are incorporated herein by reference.

FIELD

The embodiments of the present invention relate to a throttle mechanism and a turbine.

BACKGROUND

The turbine is configured so that a high-temperature and high-pressure working medium (for example, a supercritical $CO_2$ medium) is introduced into a turbine casing, to thereby cause a turbine rotor to rotate. Here, there has been proposed to provide a cooling medium flow path through which a cooling medium flows in the turbine rotor, or the like, in consideration of heat resistance. Then, there has also been proposed to provide a throttle mechanism such as a flow rate regulating plug in order to regulate the flow rate of the cooling medium flowing through the cooling medium flow path.

In the turbine where the pressure ratio between an initial stage and a final stage changes significantly between a rated operation time and a startup time (such as a $CO_2$ turbine into which a supercritical $CO_2$ medium is introduced as the working medium), the temperature of a passage part through which the working medium flows becomes high after ignition, making it necessary to cool each part of the configuration appropriately. The turbine stage located downstream has a large differential pressure between the working medium and the cooling medium, making it necessary to increase the pressure loss for regulating the flow rate. Therefore, when the pressure loss is adjusted to the conditions at a rated operation time with a large differential pressure, the cooling medium does not easily flow to the turbine stage located downstream at a startup time with a small differential pressure, resulting in that the cooling medium supply may not occur in some cases. Therefore, changing the cross-sectional area of the flow path (cooling medium flow path) through which the fluid of the cooling medium flows by the throttle mechanism according to the operating state of the turbine is required.

However, for example, when a valve is installed in a pipe as the throttle mechanism and the valve is driven by an actuator to change the cross-sectional area of the flow path in the pipe, the configuration becomes more complex and an installation space for installing the pipe is required. Further, when the above-described pipe needs to be installed to penetrate through the turbine casing, leakage of the working medium may occur in the portion where the pipe penetrates, and at the same time, the cost may increase as a result of the installation.

Due to the above-described circumstances, it is not easy to change the cross-sectional area of the flow path according to the operating state in the past.

Therefore, the problem to be solved by the present invention is to provide a throttle mechanism and a turbine that are capable of easily changing a cross-sectional area of a flow path according to an operating state.

BRIEF DESCRIPTION OF THE DRAWINGS

FIG. 4 is a view schematically illustrating an entire configuration of a power generation system according to a fourth embodiment.

FIG. 5 is a side view schematically illustrating a side surface of a turbine in the power generation system according to the fourth embodiment.

DETAILED DESCRIPTION

A throttle mechanism in an embodiment is a throttle mechanism that controls a flow rate of a fluid flowing through a flow path, and is configured to make a cross-sectional area of the flow path change autonomously according to temperature.

First Embodiment

[A] Configuration of a Throttle Mechanism

Figure 1:
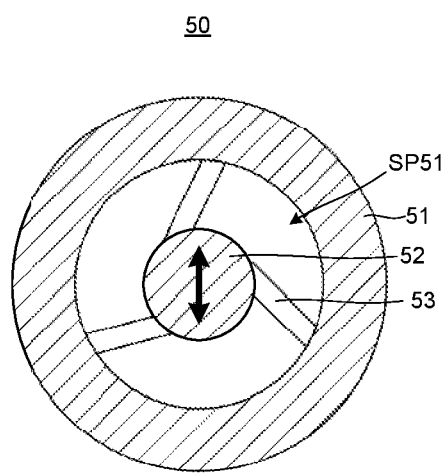
FIG. 1 is a cross-sectional view schematically illustrating a configuration of a throttle mechanism according to a first embodiment.

There is explained a configuration of a throttle mechanism according to a first embodiment using FIG. 1.

In this embodiment, a throttle mechanism 50 includes, as illustrated in FIG. 1, a pipe-shaped member 51, a rod-shaped member 52, and a support member 53, and controls a flow rate of a fluid (such as a cooling medium) flowing through a flow path (such as a cooling medium flow path). Here, the throttle mechanism 50 is configured to make a cross-sectional area of the flow path (flow path area) change autonomously according to temperature. FIG. 1 illustrates a cross section in a plane orthogonal to the axial direction of the pipe-shaped member 51 and the rod-shaped member 52. There are sequentially explained parts configuring the throttle mechanism 50.

In the throttle mechanism 50 in this embodiment, the pipe-shaped member 51 is, for example, a cylindrical pipe-shaped body. The pipe-shaped member 51 includes thereinside an internal space SP51 forming a flow path such as a cooling medium flow path.

The rod-shaped member 52 is installed in the internal space SP51 of the pipe-shaped member 51. Here, the rod-shaped member 52 is, for example, a cylindrical rod-shaped body and is arranged to be coaxial with the pipe-shaped member 51.

The support member 53 is provided to support the rod-shaped member 52 in the internal space SP51 of the pipe-shaped member 51. Here, the support member 53 is a plurality of rod-shaped bodies, each of which has one end thereof connected to an inner peripheral surface of the pipe-shaped member 51 and has the other end thereof connected to an outer peripheral surface of the rod-shaped member 52.

In this embodiment, the linear expansion coefficient of the material forming the pipe-shaped member 51 and the linear expansion coefficient of the material forming the rod-shaped member 52 are different from each other. Therefore, the distance between the pipe-shaped member 51 and the rod-shaped member 52 varies according to temperature in the throttle mechanism 50 in this embodiment. As a result, the cross-sectional area in a plane orthogonal to the axial directions of the pipe-shaped member 51 and the rod-shaped member 52 changes in the flow path.

Specifically, when the linear expansion coefficient of the material forming the rod-shaped member 52 is larger than that of the material forming the pipe-shaped member 51, the distance between the inner peripheral surface of the pipe-shaped member 51 and the outer peripheral surface of the rod-shaped member 52 becomes narrower because the rod-shaped member 52 expands more than the pipe-shaped member 51 as temperature rises. As a result, the cross-sectional area of the flow path decreases. One example of the materials in this case is as follows. In this case, the linear expansion coefficient of the support member 53 is preferred to be closer to that of the rod-shaped member 52 than to that of the pipe-shaped member 51 (this is because in the opposite case, stress is generated at a root portion by tension).

Materials forming the pipe-shaped member 51: High Cr heat resistant alloy steel (12Cr steel), Aluminum alloy Materials forming the rod-shaped member 52: Austenitic stainless steel, Titanium alloy, Invar On the other hand, when the linear expansion coefficient of the material forming the rod-shaped member 52 is smaller than that of the material forming the pipe-shaped member 51, the distance between the inner peripheral surface of the pipe-shaped member 51 and the outer peripheral surface of the rod-shaped member 52 becomes wider because the rod-shaped member 52 contracts more than the pipe-shaped member 51 as temperature falls. As a result, the cross-sectional area of the flow path increases. One example of the materials in this case is as follows. In this case, the linear expansion coefficient of the support member 53 is preferred to be closer to that of the pipe-shaped member 51 than to that of the rod-shaped member 52 (this is because in the opposite case, stress is generated at a root portion by tension).

Materials forming the pipe-shaped member 51: Austenitic stainless steel, Titanium alloy, Invar Materials forming the rod-shaped member 52: High Cr heat resistant alloy steel (12Cr steel), Aluminum alloy

[B] Summary

As above, the throttle mechanism 50 in this embodiment is configured to make the cross-sectional area of the flow path change autonomously according to temperature. Therefore, in this embodiment, changing the cross-sectional area of the flow path can easily be achieved when temperature changes according to the operating state of the turbine, for example.

Second Embodiment

[A] Configuration of a Throttle Mechanism

Figure 2A:
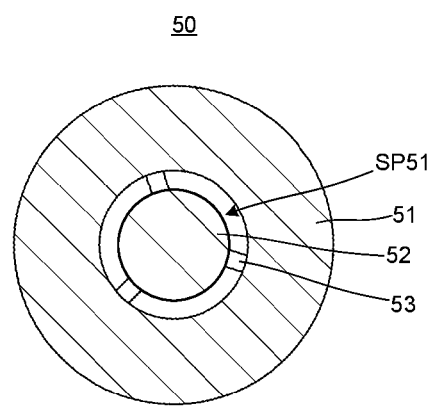
FIG. 2A is a cross-sectional view schematically illustrating a configuration of a throttle mechanism according to a second embodiment.
Figure 2B:
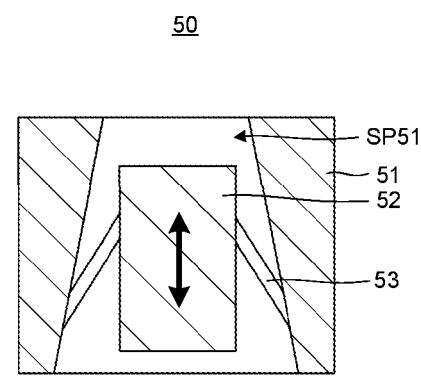
FIG. 2B is a top view schematically illustrating the configuration of the throttle mechanism according to the second embodiment.

There is explained a configuration of a throttle mechanism according to a second embodiment using FIG. 2A and FIG. 2B.

A throttle mechanism 50 in this embodiment includes, as illustrated in FIG. 2A and FIG. 2B, a pipe-shaped member 51, a rod-shaped member 52, and a support member 53 similarly to the first embodiment, and controls a flow rate of a fluid (such as a cooling medium) flowing through a flow path (such as a cooling medium flow path). Here, the throttle mechanism 50 is configured to make a cross-sectional area of the flow path change autonomously according to temperature. FIG. 2A illustrates a top surface in a plane orthogonal to the axial direction of the pipe-shaped member 51 and the rod-shaped member 52. FIG. 2B illustrates a cross section in a plane along the axial direction of the pipe-shaped member 51 and the rod-shaped member 52.

In the throttle mechanism 50 in this embodiment, an internal space SP51 of the pipe-shaped member 51 has, for example, a truncated conical shape, and its cross-sectional area becomes narrower from one end (lower end) to the other end (upper end) in the axial direction of the pipe-shaped member 51 and the rod-shaped member 52.

The rod-shaped member 52 is arranged to be coaxial with the internal space SP51 of the pipe-shaped member 51 in the internal space SP51 of the pipe-shaped member 51.

The support member 53 is provided to support the rod-shaped member 52 in the internal space SP51 of the pipe-shaped member 51. Here, the support member 53 is a plurality of rod-shaped bodies, each of which has one end thereof connected to an inner peripheral surface of the pipe-shaped member 51 and has the other end thereof connected to an outer peripheral surface of the rod-shaped member 52.

In this embodiment, the throttle mechanism 50 is configured so that as the support member 53 expands or contracts according to temperature, the rod-shaped member 52 moves in the internal space SP51 and the distance between the pipe-shaped member 51 and the rod-shaped member 52 varies, and thereby the cross-sectional area of the flow path changes.

For example, when temperature rises, the support member 53 expands with the rise in temperature, and the rod-shaped member 52 moves upward in the internal space SP51. Thereby, as can be seen from FIG. 2B, the distance between the inner peripheral surface of the pipe-shaped member 51 and the outer peripheral surface of the rod-shaped member 52 becomes short, resulting in a smaller cross-sectional area of the flow path. In contrast to this, when temperature falls, the support member 53 contracts with the fall in temperature, and the rod-shaped member 52 moves downward in the internal space SP51. Thereby, as can be seen from FIG. 2B, the distance between the inner peripheral surface of the pipe-shaped member 51 and the outer peripheral surface of the rod-shaped member 52 becomes long, resulting in a larger cross-sectional area of the flow path.

Regarding the linear expansion coefficient, the linear expansion coefficient of the rod-shaped member 52 and the support member 53 is preferably larger than that of the pipe-shaped member 51. When only the support member 53 expands, the cross-sectional area of the flow path becomes small because the rod-shaped member 52 is pushed up. Further, when only the rod-shaped member 52 expands, as in the first embodiment, the cross-sectional area of the flow path between the rod-shaped member 52 and the pipe-shaped member 51 becomes small.

The throttle mechanism 50 may be configured to make the cross-sectional area of the flow path large as temperature rises and make the cross-sectional area of the flow path small as temperature falls. This configuration, though not illustrated, can be fabricated by forming, for example, the internal space SP51 of the pipe-shaped member 51 so that its cross-sectional area increases from one end (lower end) to the other end (upper end) in the axial direction of the pipe-shaped member 51 and the rod-shaped member 52 (see FIG. 2B). In this case, the relationship of the linear expansion coefficient is preferably opposite to the above-described relationship.

[B] Summary

As above, the throttle mechanism 50 in this embodiment is configured to make the cross-sectional area of the flow path change autonomously according to temperature in the same manner as in the first embodiment. Therefore, in this embodiment as well, changing the cross-sectional area of the flow path can easily be achieved when temperature changes according to the operating state of the turbine, for example.

Third Embodiment

[A] Configuration of a Throttle Mechanism

Figure 3A:
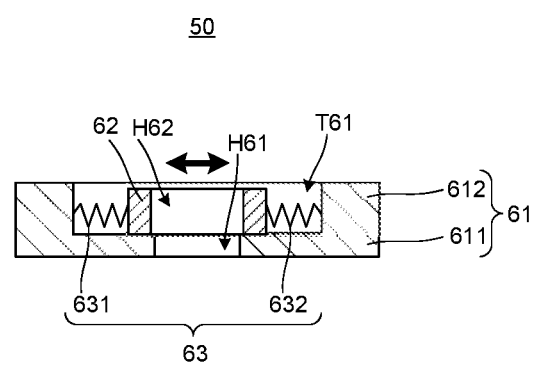
FIG. 3A is a cross-sectional view schematically illustrating a configuration of a throttle mechanism according to a third embodiment.
Figure 3B:
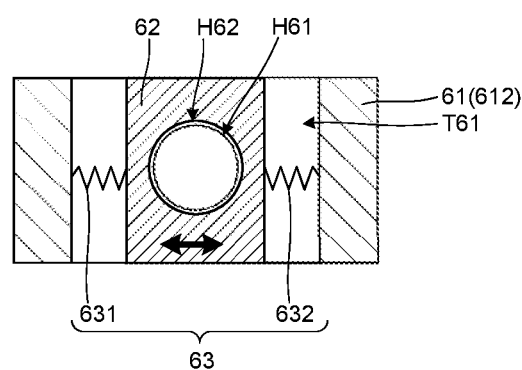
FIG. 3B is a top view schematically illustrating the configuration of the throttle mechanism according to the third embodiment.

There is explained a configuration of a throttle mechanism according to a third embodiment using FIG. 3A and FIG. 3B.

A throttle mechanism 50 in this embodiment includes, unlike the first embodiment, a first flow path forming member 61, a second flow path forming member 62, and a biasing member 63 as illustrated in FIG. 3A and FIG. 3B, and controls a flow rate of a fluid (such as a cooling medium) flowing through a flow path (such as a cooling medium flow path). The first flow path forming member 61 includes a first through hole H61 forming the flow path, and the second flow path forming member 62 includes a second through hole H62 forming the flow path. Here, the throttle mechanism 50 is configured to make a cross-sectional area of the flow path change autonomously according to temperature. FIG. 3A illustrates a cross section in a plane orthogonal to the center axis direction of the first through hole H61 and the second through hole H62. FIG. 3B illustrates a top surface in a plane along the center axis direction of the first through hole H61 and the second through hole H62.

In the throttle mechanism 50 in this embodiment, the first flow path forming member 61 includes a plate-shaped body portion 611 and a projecting portion 612. In the plate-shaped body portion 611 of the first flow path forming member 61, the first through hole H61 is formed. Of the first flow path forming member 61, the projecting portions 612 are paired and are provided at both ends on the upper surface of the plate-shaped body portion 611. In the first flow path forming member 61, in which a rectangular-shaped trench T61 (recessed portion) is interposed between a pair of the projecting portions 612 on the upper surface of the plate-shaped body portion 611, the trench T61 is located above the first through hole H61 in line with the first through hole H61 in the center axis direction of the cylindrical-shaped first through hole H61 and communicates with the first through hole H61.

The second flow path forming member 62 is a plate-shaped body, in which the second through hole H62 forming the flow path with the first through hole H61 is formed. In the second flow path forming member 62, the second through hole H62 has a cylindrical shape, and for example, the inside diameter of the second through hole H62 is larger than that of the first through hole H61. Further, the second flow path forming member 62 is movably installed inside the trench T61 of the first flow path forming member 61. The width in the moving direction in the second flow path forming member 62 is narrower than that in the moving direction in the trench T61 of the first flow path forming member 61.

The biasing member 63 is, for example, a spring and is installed inside the trench T61 to bias the second flow path forming member 62 in the moving direction of the second flow path forming member 62. Here, the biasing member 63 includes a first biasing member 631 and a second biasing member 632.

The first biasing member 631 is installed inside the trench T61 on one side (left side) in the moving direction of the second flow path forming member 62. The second biasing member 632 is installed inside the trench T61 on the other side (right side) in the moving direction of the second flow path forming member 62.

The material that forms the first biasing member 631 and the material that forms the second biasing member 632 are different from each other in the tendency that a Young's modulus changes according to temperature. Therefore, the size of an overlapping portion of the first through hole H61 and the second through hole H62 varies as the second biasing member 632 moves inside the trench T61 according to temperature. As a result, the cross-sectional area of the flow path formed by the first through hole H61 and the second through hole H62 changes.

The material forming the second biasing member 632 is made larger than the material forming the first biasing member 631 in the rate at which the Young's modulus changes as temperature rises from one temperature to another temperature, for example. This causes the balance between a pressing force of the first biasing member 631 and a pressing force of the second biasing member 632 to change as temperature rises, and the overlapping portion of the first through hole H61 and the second through hole H62 becomes small, and thereby, the cross-sectional area of the flow path becomes small. Then, as temperature falls, the overlapping portion of the first through hole H61 and the second through hole H62 becomes large, and thereby the cross-sectional area of the flow path becomes large.

Figure 3C:
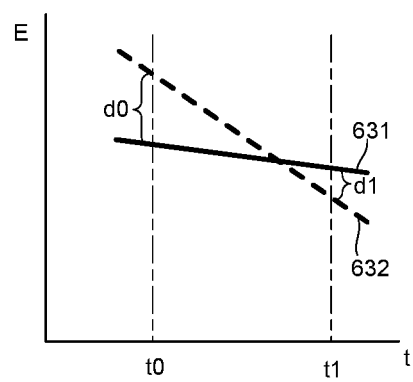
FIG. 3C is a view illustrating one example of characteristics of a first biasing member 631 and a second biasing member 632 in the throttle mechanism according to the third embodiment.

FIG. 3C is a view illustrating one example of characteristics of the first biasing member 631 and the second biasing member 632 in the throttle mechanism 50 according to the third embodiment. In FIG. 3C, the horizontal axis indicates a temperature t and the vertical axis indicates a Young's modulus E.

As illustrated in FIG. 3C, the first biasing member 631 and the second biasing member 632 are different from each other in the relationship between the temperature and the Young's modulus. Here, the Young's modulus E at a temperature t0 is higher in the second biasing member 632 than in the first biasing member 631, and there is a difference d0 between the Young's modulus E of the first biasing member 631 and the Young's modulus E of the second biasing member 632. Then, the Young's modulus E at temperature t1, which is higher than the temperature t0, is lower in the second biasing member 632 than in the first biasing member 631, and there is a difference d1 between the Young's modulus E of the first biasing member 631 and the Young's modulus E of the second biasing member 632. As described above, when the temperature changes from the temperature t0 to the temperature t1, the differences d0 and d1 between the Young's modulus E of the first biasing member 631 and the Young's modulus E of the second biasing member 632 change. As a result, there is generated a difference also between a biasing force of the first biasing member 631 and a biasing force of the second biasing member 632 according to temperature, so that the second flow path forming member 62 moves with respect to the first flow path forming member 61.

The throttle mechanism 50 may be configured to make the cross-sectional area of the flow path large as temperature rises and make the cross-sectional area of the flow path small as temperature falls. This configuration, though not illustrated, can be fabricated by configuring the throttle mechanism 50 so that, for example, the overlapping portion of the first through hole H61 and the second through hole H62 becomes large from the state where the overlapping portion is small as temperature rises.

[B] Summary

As above, the throttle mechanism 50 in this embodiment is configured to make the cross-sectional area of the flow path change autonomously according to temperature in the same manner as in the first embodiment. Therefore, in this embodiment as well, changing the cross-sectional area of the flow path can easily be achieved when temperature changes according to the operating state of the turbine, for example.

[C] Modified Example

In the above-described embodiment, the characteristics of the first biasing member 631 and the second biasing member 632 are illustrated in FIG. 3C, but they are not limited to these.

Figure 3D:
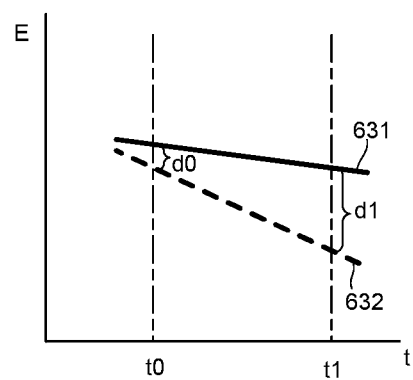
FIG. 3D is a view illustrating one example of characteristics of a first biasing member 631 and a second biasing member 632 in a throttle mechanism according to a modified example of the third embodiment.
Figure 3E:
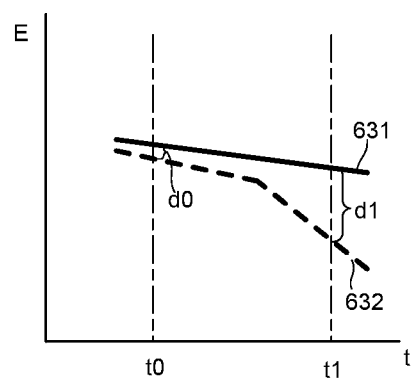
FIG. 3E is a view illustrating one example of the characteristics of the first biasing member 631 and the second biasing member 632 in the throttle mechanism according to the modified example of the third embodiment.

FIG. 3D and FIG. 3E are views each illustrating one example of characteristics of a first biasing member 631 and a second biasing member 632 in a throttle mechanism according to a modified example of the third embodiment. In FIG. 3D and FIG. 3E, the horizontal axis indicates the temperature t and the vertical axis indicates the Young's modulus E.

As illustrated in FIG. 3D, the Young's modulus E at the temperature t1 higher than the temperature t0 may be higher in the second biasing member 632 than in the first biasing member 631 unlike the case of FIG. 3C. Further, as illustrated in FIG. 3D, the Young's modulus E of the second biasing member 632 may vary in the rate at which the Young's modulus E changes as temperature rises between the temperature t0 and the temperature t1. Similarly to the Young's modulus E of the second biasing member 632, though not illustrated, the Young's modulus E of the first biasing member 631 may also vary in the rate at which the Young's modulus E changes as temperature rises between the temperature t0 and the temperature t1. Even in such a case, when the temperature changes from t0 to t1, the differences d0, d1 between the Young's modulus E of the first biasing member 631 and the Young's modulus E of the second biasing member 632 change, and the biasing force of the first biasing member 631 and the biasing force of the second biasing member 632 also differ from each other according to temperature. Therefore, the second flow path forming member 62 moves with respect to the first flow path forming member 61.

Further, in the above-described embodiment, there has been explained as an example the case where the first through hole H61 and the second through hole H62 have a circular shape, but the present invention is not limited to this.

Figure 3F:
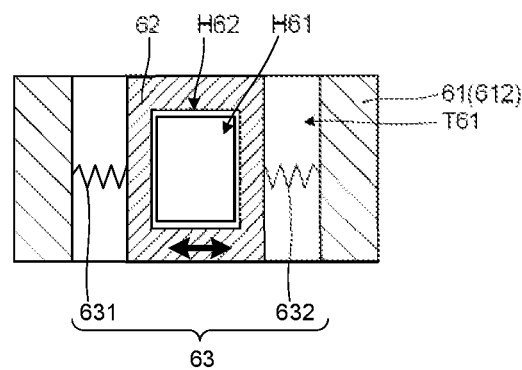
FIG. 3F is a top view schematically illustrating a configuration of the throttle mechanism according to the modified example of the third embodiment.
Figure 3G:
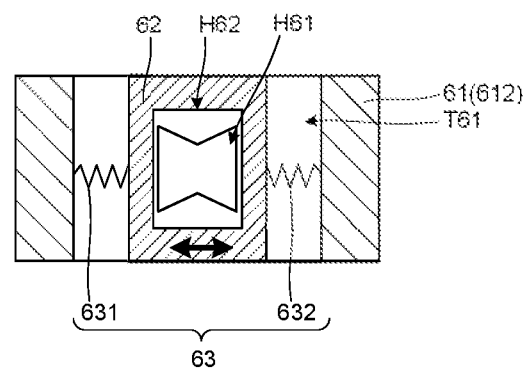
FIG. 3G is a top view schematically illustrating the configuration of the throttle mechanism according to the modified example of the third embodiment.

FIG. 3F and FIG. 3G are top views each schematically illustrating a configuration of the throttle mechanism according to the modified example of the third embodiment.

As illustrated in FIG. 3F, the first through hole H61 and the second through hole H62 may have a rectangular shape, for example. Having a rectangular shape, the first through hole H61 and the second through hole H62 can be designed easily because it is easy to calculate the area where the first and second through holes overlap.

Besides, as illustrated in FIG. 3G, the first through hole H61 may be formed to be wider at the sides than at the center in the moving direction. As a result, the change in the area can be made larger than in the case of FIG. 3F.

Fourth Embodiment

[A] Configuration of a Power Generation System

FIG. 4 is a view schematically illustrating an entire configuration of a power generation system according to a fourth embodiment.

As illustrated in FIG. 4, the power generation system in this embodiment is configured to generate power using a supercritical working medium (working $CO_2$ medium). There are sequentially explained respective parts configuring the power generation system in this embodiment.

[A-1] Turbine 10

In the power generation system in this embodiment, a supercritical working medium is supplied to a turbine 10 from a combustor 81. Then, the working medium expands and performs work in the turbine 10, which causes a rotating shaft of the turbine 10 to rotate. The medium exhausted from turbine 10 flows to a regenerative heat exchanger 82.

[A-2] Power Generator 11

A power generator 11 is configured to generate power by driving the turbine 10. Here, a rotating shaft of the power generator 11 is coupled to the rotating shaft of the turbine 10, and the rotation of the rotating shaft of the turbine 10 causes the rotating shaft of the power generator 11 to rotate, and thereby power is generated in the power generator 11.

[A-3] Regenerative Heat Exchanger 82

The medium exhausted from the turbine 10 and a medium discharged from a $CO_2$ pump 86 flow into the regenerative heat exchanger 82, where heat exchange is performed between the two. Here, the medium exhausted from the turbine 10 is cooled by the heat exchange in the regenerative heat exchanger 82. On the other hand, the medium discharged from the $CO_2$ pump 86 is heated by the heat exchange in the regenerative heat exchanger 82 to be supplied to the combustor 81.

[A-4] Cooler 83

In a cooler 83, the medium, which is exhausted from the turbine 10 and then is subjected to heat exchange in the regenerative heat exchanger 82, is cooled. Thereby, in the cooler 83, water vapor contained in the medium discharged from the regenerative heat exchanger 82 is condensed.

[A-5] Moisture Separator 85

The medium discharged from the cooler 83 is supplied to a moisture separator 85. The moisture separator 85 separates water (liquid-phase water) generated by the condensation in the cooler 83 from the supplied medium. The separated water is discharged to the outside from the moisture separator 85. Therefore, in the moisture separator 85, a medium containing high-purity $CO_2$ can be obtained.

[A-6] $CO_2$ Pump 86

The $CO_2$ pump 86 receives the medium being high-purity $CO_2$ supplied from the moisture separator 85 to boost the supplied medium to a supercritical pressure. A portion of the medium boosted by the $CO_2$ pump 86 is discharged to the outside to be used for storage, enhanced oil recovery, or the like, for example. Here, for example, $CO_2$ corresponding to the amount of $CO_2$ increased by combustion in the combustor 81 is discharged to the outside. Then, the rest of the medium boosted by the $CO_2$ pump 86 is supplied to the regenerative heat exchanger 82 and heated as described above.

[A-7] Combustor 81

A portion of the medium extracted from the middle of the regenerative heat exchanger 82 is supplied to the turbine 10 as a cooling medium (cooling $CO_2$ medium). Then, the rest of the medium that has passed through the regenerative heat exchanger 82 is led to the combustor 81. In other words, in the regenerative heat exchanger 82, the medium boosted by the $CO_2$ pump 86 is heated by heat exchange with the medium exhausted from the turbine 10 and then flows into the combustor 81. To the combustor 81, a fuel is supplied from the outside and oxygen is supplied from an oxygen generator 80. In the combustor 81, a combustion gas is generated by combustion, and a supercritical working medium containing the combustion gas is discharged.

[B] Configuration of the Turbine 10

Figure 6:
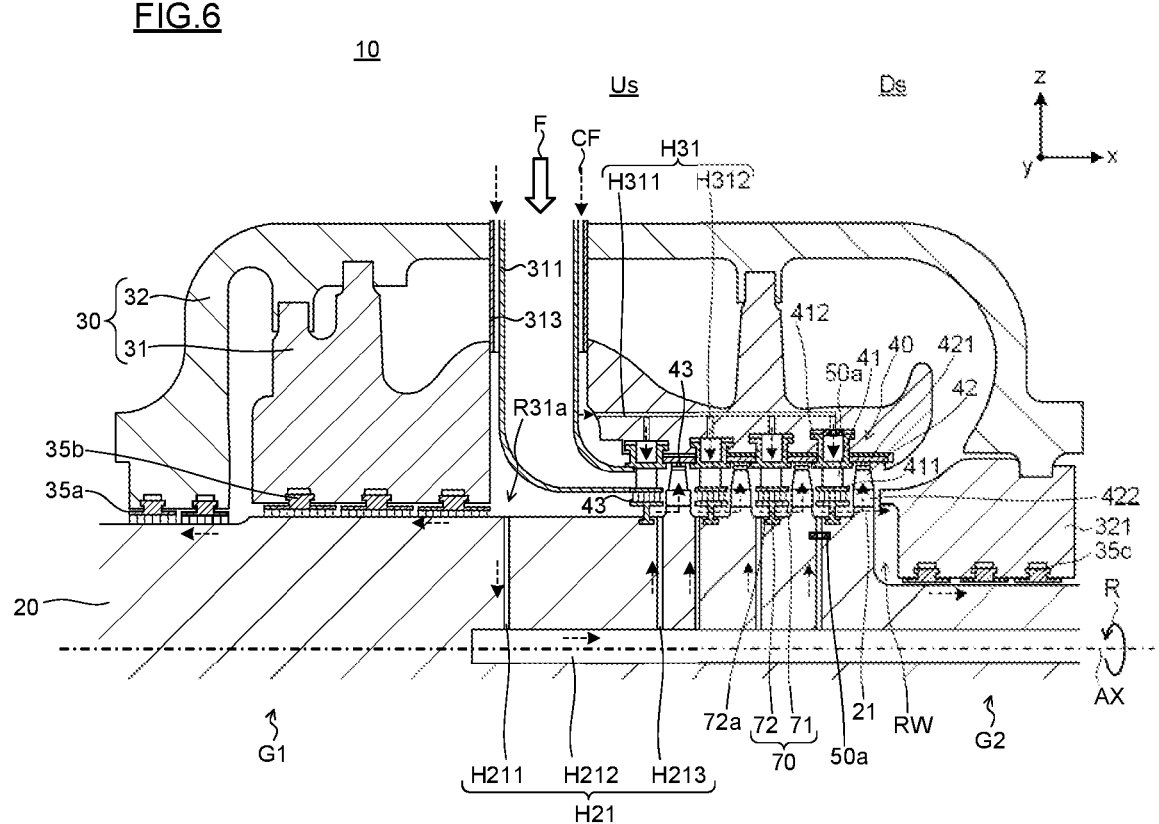
FIG. 6 is a cross-sectional view schematically illustrating a partial cross section of the turbine according to the fourth embodiment.

There is explained one example of the turbine 10 according to the fourth embodiment using FIG. 5 and FIG. 6.

FIG. 5 schematically illustrates a side surface of the turbine 10. FIG. 6 schematically illustrates a partial cross section of the turbine 10. In FIG. 6, the longitudinal direction is a vertical direction z, the lateral direction is a first horizontal direction x, and the direction vertical to the paper surface is a second horizontal direction y. FIG. 6 schematically illustrates a partial cross section (mainly a cross section on the upper half side) of a vertical plane (xz plane).

In the turbine 10 according to the embodiment, as illustrated in FIG. 5, a working medium F is introduced into the inside via a combustor casing 811.

As illustrated in FIG. 6, the turbine 10 includes a turbine rotor 20, a turbine casing 30, and a turbine stage 40. The turbine 10 is of a multistage type, in which a plurality of the turbine stages 40 are arranged side by side in an axial direction (x) along a rotation center axis AX of the turbine rotor 20. In the turbine 10, the working medium F is introduced into an inner casing 31 housed in an outer casing 32 of the turbine casing 30 via a transition piece 311. Then, the introduced working medium F works sequentially in a plurality of the turbine stages 40 arranged side by side from an upstream side Us to a downstream side Ds.

Thereafter, the working medium F is discharged to the outside of the turbine casing 30 through an exhaust pipe 90, as illustrated in FIG. 5.

There are sequentially explained in detail parts configuring the turbine 10 according to the embodiment.

[B-1] Turbine Rotor 20

The turbine rotor 20 is a rod-shaped body, and is supported to be rotatable by a bearing (not illustrated) so that the rotation center axis AX is along the first horizontal direction x. At the turbine rotor 20, a plurality of rotor wheels 21 are provided on the outer peripheral surface. A plurality of the rotor wheels 21 are arrayed side by side in the axial direction (x) along the rotation center axis AX. Though not illustrated in FIG. 6, the turbine rotor 20 is coupled to the power generator.

[B-2] Turbine Casing 30

The turbine casing 30 has a double-casing structure including the inner casing 31 and the outer casing 32.

[B-2-1] Inner Casing 31

In the turbine casing 30, the inner casing 31 is installed around the turbine rotor 20 in a manner to surround a plurality of the turbine stages 40.

[B-2-2] Outer Casing 32

In the turbine casing 30, the outer casing 32 is configured to house the turbine rotor 20 via the inner casing 31.

[B-2-3] Packing Head 321

Further, in the outer casing 32, a packing head 321 is installed on the downstream side Ds from the final-stage turbine stage 40 and at an inner portion in the radial direction. Here, a final-stage wheel space RW intervenes between the packing head 321 and the final-stage rotor wheel 21 in the axial direction.

[B-3] Turbine Stage 40

The turbine stage 40 includes a stator blade cascade composed of a plurality of stator blades 41 (nozzle blades), and a rotor blade cascade composed of a plurality of rotor blades 42. The turbine stage 40 is composed of the stator blade cascade and the rotor blade cascade adjacent to the stator blade cascade on the downstream side Ds, and a plurality of the turbine stages 40 are arranged side by side in the axial direction along the rotation center axis AX.

[B-3-1] Stator Blade 41

A plurality of the stator blades 41 (nozzle blades) forming the stator blade cascade are supported inside the inner casing 31. A plurality of the stator blades 41 are arrayed in a rotation direction R in a manner to surround the turbine rotor 20 between an inner shroud 411 and an outer shroud 412.

[B-3-2] Rotor Blade 42

A plurality of the rotor blades 42 forming the rotor blade cascade are arrayed in the rotation direction R in a manner to surround the turbine rotor 20 inside the inner casing 31. In the rotor blade 42, an implanted part 422 is provided at an inner portion in the radial direction. The implanted part 422 is fitted on the outer peripheral surface of the rotor wheel 21 of the turbine rotor 20. The outer periphery of the rotor blade 42 is surrounded by a shroud segment 421. The shroud segment 421 is supported by the outer shroud 412.

At a portion of the outer peripheral surface of the turbine rotor 20, facing the stator blade 41, for example, a heat insulating piece 70 is provided. Here, the heat insulating piece 70 is supported by a portion of the outer peripheral surface of the turbine rotor 20, facing the inner surface of the inner shroud 411. The heat insulating piece 70 is provided to insulate heat between a main flow path through which the working medium F flows inside the turbine casing 30 and the turbine rotor 20.

[B-3-3] Heat Insulating Piece 70

The heat insulating piece 70 includes a heat insulating plate 71 and a leg part 72, and the heat insulating plate 71 and the leg part 72 are provided in sequence as going from the outer side to the inner side in the radial direction of the turbine rotor 20.

In the heat insulating piece 70, the heat insulating plate 71 includes a portion extending along the rotation center axis AX of the turbine rotor 20. The heat insulating plate 71 is installed to have a gap intervening between the outer peripheral surface of the heat insulating plate 71 and the inner peripheral surface of the inner shroud 411 and have a space intervening between the inner peripheral surface of the heat insulating plate 71 and the outer peripheral surface of the turbine rotor 20. The leg part 72 extends in the radial direction of the turbine rotor 20, and an engagement part 72a is formed on the inner side in the radial direction in the leg part 72. The engagement part 72a is engaged with the turbine rotor 20.

In order to seal a clearance between the inner peripheral surface of the stator blade 41 and the outer peripheral surface of the heat insulating plate 71, a seal fin 43 is provided as necessary. Further, in order to seal a clearance between the outer peripheral surface of the rotor blade 42 and the inner peripheral surface of the shroud segment 421 provided in the inner casing 31, the seal fin 43 is provided.

[B-4] Upstream-Side Gland Part G1/Downstream-Side Gland Part G2

The turbine 10 includes an upstream-side gland part G1 and a downstream-side gland part G2.

The upstream-side gland part G1 is one end portion located on the upstream side Us of the working medium F of both end portions where the turbine stage 40 is not arranged in the axial direction in the turbine 10. The downstream-side gland part G2 is one end portion located on the downstream side Ds of the working medium F of both the end portions where the turbine stage 40 is not arranged in the axial direction in the turbine 10. In other words, a portion where the turbine stages 40 are arranged in the axial direction in the turbine 10 is sandwiched between the upstream-side gland part G1 and the downstream-side gland part G2.

[B-5] Gland Sealing Parts 35a, 35b, and 35c

In the upstream-side gland part G1 and the downstream-side gland part G2, gland sealing parts 35a, 35b, and 35c are installed. The gland sealing parts 35a, 35b, and 35c are provided to seal a clearance between a rotary body including the turbine rotor 20 and a stationary body including the turbine casing 30.

Specifically, a plurality of the gland sealing parts 35a are installed on the inner peripheral surface of the outer casing 32 in a manner to seal a clearance between the inner peripheral surface of the outer casing 32 and the outer peripheral surface of the turbine rotor 20 in the upstream-side gland part G1. A plurality of the gland sealing parts 35b are installed on the inner peripheral surface of the inner casing 31 in a manner to seal a clearance between the inner peripheral surface of the inner casing 31 and the outer peripheral surface of the turbine rotor 20 in the upstream-side gland part G1. Further, a plurality of the gland sealing parts 35c are installed on the inner peripheral surface of the packing head 321 in a manner to seal a clearance between the inner peripheral surface of the packing head 321 installed in the inner casing 31 and the outer peripheral surface of the turbine rotor 20 in the downstream-side gland part G2.

The gland sealing parts 35a, 35b, and 35c are each configured to include, for example, a labyrinth fin. Other than that, the gland sealing parts 35a, 35b, and 35c may be formed of various seal structures such as a brush seal, a leaf seal, an abradable seal, and a honeycomb seal.

[B-6] Transition Piece 311

The transition piece 311 includes a portion extending in the radial direction in a manner to penetrate the outer casing 32 and the inner casing 31 from above the turbine casing 30. The transition piece 311 is coupled to the initial-stage turbine stage 40 so as to introduce the working medium F into the initial-stage turbine stage 40.

[B-7] Cooling Medium Introduction Pipe 313

A cooling medium introduction pipe 313 extends, similarly to the transition piece 311, in the radial direction in a manner to penetrate the outer casing 32 and the inner casing 31 from above the turbine casing 30. The cooling medium introduction pipe 313 is installed in a manner to surround a portion extending in the radial direction in the transition piece 311. The inside diameter of the cooling medium introduction pipe 313 is larger than the outside diameter of the portion extending in the radial direction in the transition piece 311, and a cooling medium CF flows between the inner peripheral surface of the cooling medium introduction pipe 313 and the outer peripheral surface of the portion extending in the radial direction in the transition piece 311. The cooling medium CF having flowed between the cooling medium introduction pipe 313 and the transition piece 311 is introduced into a cooling chamber R31a formed in a manner to surround, in the rotation direction R, the turbine rotor 20 inside the inner casing 31.

[B-8] Inner Casing Cooling Medium Flow Path H31

In the inner casing 31, an inner casing cooling medium flow path H31 is formed through which the cooling medium CF flows. The inner casing cooling medium flow path H31 is provided to supply the cooling medium CF to the stator blade 41 of the turbine stage 40. Here, the inner casing cooling medium flow path H31 includes a first inner casing cooling medium flow path part H311 and a second inner casing cooling medium flow path part H312.

The first inner casing cooling medium flow path part H311 is a hole along the axial direction of the turbine rotor 20, and has one end thereof, which is located on the upstream side Us of the working medium F, communicating with the cooling chamber R31a.

The second inner casing cooling medium flow path part H312 is a hole along the radial direction of the turbine rotor 20 and is formed on the inner side relative to the first inner casing cooling medium flow path part H311 in the radial direction. The second inner casing cooling medium flow path part H312 has one end thereof, which is located on the outer side in the radial direction, communicating with the first inner casing cooling medium flow path part H311. In contrast to this, the other end of the second inner casing cooling medium flow path part H312, which is located on the inner side in the radial direction, communicates with the stator blade 41 via the outer shroud 412.

The inner casing cooling medium flow path H31 is provided one each, for example, on the upper half side and the lower half side in the turbine 10. A plurality of the inner casing cooling medium flow paths H31 are preferably provided at regular intervals in the rotation direction R.

[B-9] Rotor Cooling Flow Path H21

In the turbine rotor 20, a rotor cooling flow path H21 is formed through which the cooling medium CF flows. The rotor cooling flow path H21 is configured so that the cooling medium CF flows from the cooling chamber R31a to the space located between the inner peripheral surface of the heat insulating plate 71 and the outer peripheral surface of the turbine rotor 20. Here, the rotor cooling flow path H21 includes a first rotor cooling flow path part H211, a second rotor cooling flow path part H212, and a third rotor cooling flow path part H213.

The first rotor cooling flow path part H211 is a hole along the radial direction of the turbine rotor 20. The first rotor cooling flow path part H211 has one end thereof, which is located on the outer side in the radial direction, communicating with the cooling chamber R31a. In contrast to this, the other end of the first rotor cooling flow path part H211, which is located on the inner side in the radial direction, communicates with the second rotor cooling flow path part H212.

The second rotor cooling flow path part H212 is a hole along the axial direction of the turbine rotor 20, and provided coaxially with the rotation center axis AX of the turbine rotor 20.

The third rotor cooling flow path part H213 is a hole along the radial direction of the turbine rotor 20. The third rotor cooling flow path part H213 has one end thereof, which is located on the inner side in the radial direction, communicating with the second rotor cooling flow path part H212. In contrast to this, the other end of the third rotor cooling flow path part H213, which is located on the outer side in the radial direction, communicates with the space located between the inner peripheral surface of the heat insulating plate 71 and the outer peripheral surface of the turbine rotor 20. The third rotor cooling flow path part H213 is provided to correspond to each of a plurality of the turbine stages 40.

[B-10] Throttle Mechanism 50a

In the turbine 10 in this embodiment, throttle mechanisms 50a are provided. The throttle mechanism 50a is provided at the rotor cooling flow path H21 and the inner casing cooling medium flow path H31, which are the cooling medium flow path intended for introducing the cooling medium into the turbine stage 40.

Specifically, the throttle mechanism 50a is not installed at the third rotor cooling flow path part H213 (a first cooling medium flow path part) intended for introducing the cooling medium into the turbine stage 40 on the upstream side Us from the final-stage turbine stage 40 out of a plurality of the third rotor cooling flow path parts H213 constituting the rotor cooling flow path H21. The throttle mechanism 50a is installed at the third rotor cooling flow path part H213 (a second cooling medium flow path part) intended for introducing the cooling medium into the final-stage turbine stage 40 out of a plurality of the third rotor cooling flow path parts H213.

Further, the throttle mechanism 50a is not installed at the second inner casing cooling medium flow path part H312 (first cooling medium flow path part) intended for introducing the cooling medium into the turbine stage 40 on the upstream side Us from the final-stage turbine stage 40 out of a plurality of the second inner casing cooling medium flow path parts H312 constituting the inner casing cooling medium flow path H31. The throttle mechanism 50a is installed at the second inner casing cooling medium flow path part H312 (second cooling medium flow path part) intended for introducing the cooling medium into the final-stage turbine stage 40 out of a plurality of the second inner casing cooling medium flow path parts H312.

The throttle mechanism 50a has the same configuration as that of the throttle mechanism 50 in the first embodiment, for example, and is configured to make the cross-sectional areas of the third rotor cooling flow path part H213 and the second inner casing cooling medium flow path part h312 (second cooling medium flow path part), which are intended for introducing the cooling medium into the final-stage turbine stage 40, small as temperature rises. The throttle mechanism 50a may have the same configuration as that of the throttle mechanism 50 in the second embodiment or third embodiment.

[C] Flow of the Cooling Medium CF

The flow of the cooling medium CF in the above-described turbine 10 is explained.

In the turbine 10, as illustrated in FIG. 5, the cooling medium CF is introduced into the inside of the turbine casing 30 from the outside via the combustor casing 811. Here, the cooling medium CF is a medium that has been subjected to cooling or the like after exhausted from the turbine 10, as illustrated in FIG. 4, and is introduced into the turbine 10 in a state where it is lower in temperature than the working medium F and higher in pressure than the working medium F.

Specifically, the cooling medium CF flows into the inside of the inner casing 31 through the cooling medium introduction pipe 313 as illustrated in FIG. 6. The cooling medium CF is introduced into the cooling chamber R31a provided inside the inner casing 31 via the clearance between the outer peripheral surface of the transition piece 311 and the inner peripheral surface of the cooling medium introduction pipe 313.

The cooling medium CF introduced into the cooling chamber R31a leaks from the inside to the outside of the turbine casing 30 in the upstream-side gland part G1. Specifically, in the upstream-side gland part G1, the cooling medium CF flows from the cooling chamber R31a to the clearance between the inner peripheral surface of the inner casing 31 where the gland sealing parts 35b are provided and the outer peripheral surface of the turbine rotor 20. Thereafter, the cooling medium CF flows between the inner peripheral surface of the outer casing 32 where the gland sealing parts 35a are provided and the outer peripheral surface of the turbine rotor 20.

Further, the cooling medium CF introduced into the cooling chamber R31a is introduced into the rotor cooling flow path H21 formed in the turbine rotor 20. Here, the cooling medium CF flows through the first rotor cooling flow path part H211, the second rotor cooling flow path part H212, and the third rotor cooling flow path part H213 in sequence in the rotor cooling flow path H21. The cooling medium CF then flows into the space located between the inner peripheral surface of the heat insulating plate 71 forming the heat insulating piece 70 and the outer peripheral surface of the turbine rotor 20. Then, the cooling medium CF passes through, for example, the clearance between the implanted part 422 of the rotor blade 42 and the rotor wheel 21 and is introduced into the rotor blade 42. Thereby, the turbine rotor 20 and the rotor blade 42 are cooled. The cooling medium CF introduced into the rotor blade 42 is discharged, for example, to the main flow path through which the working medium F flows inside the inner casing 31.

Besides, the cooling medium CF introduced into the cooling chamber R31a passes through the inner casing cooling medium flow path H31 formed in the inner casing 31 to be supplied to the stator blade 41 in each of a plurality of the turbine stages 40. Specifically, the cooling medium that has flowed into the inner casing cooling medium flow path H31 is introduced into a space provided on the outer side in the radial direction in the outer shroud 412. The space provided on the outer side in the radial direction in the outer shroud 412 is a space communicated in a ring shape in the rotation direction R, and communicates with, for example, a cooling hole (not illustrated) formed inside each of the stator blade 41 and the inner shroud 411. The cooling medium CF flows from the outer shroud 412 through the cooling holes formed in the stator blade 41 and the inner shroud 411 respectively in sequence. Thereby, the stator blade 41 and the like are cooled. Then, the cooling medium CF used for cooling the stator blade 41 is discharged to, for example, the main flow path through which the working medium F flows inside the inner casing 31.

As described above, in this embodiment, the throttle mechanism 50*a* is not installed at the third rotor cooling flow path part H213 intended for introducing the cooling medium into the turbine stage 40 on the upstream side Us from the final-stage turbine stage 40 out of a plurality of the third rotor cooling flow path parts H213. Similarly, the throttle mechanism 50*a* is not installed at the second inner casing cooling medium flow path part H312 intended for introducing the cooling medium into the turbine stage 40 on the upstream side Us from the final-stage turbine stage 40 out of a plurality of the second inner casing cooling medium flow path parts H312. However, the throttle mechanism 50*a* is installed at the third rotor cooling flow path part H213 and the second inner casing cooling medium flow path part H312 intended for introducing the cooling medium into the final-stage turbine stage 40. Therefore, the cooling medium is introduced into the final-stage turbine stage 40 via the throttle mechanism 50*a*.

In the final-stage turbine stage 40, the cooling medium CF that has flowed into the space located between the inner peripheral surface of the heat insulating plate 71 and the outer peripheral surface of the turbine rotor 20 is introduced into the rotor blade 42 and additionally flows to the final-stage wheel space RW located on the downstream side Ds from the final-stage rotor wheel 21 in the axial direction. The cooling medium CF that has flowed to the final-stage wheel space RW leaks from the inside to the outside of the turbine casing 30 in the downstream-side gland part G2. Specifically, in the downstream-side gland part G2, the cooling medium CF flows to the space between the inner peripheral surface of the packing head 321 where the gland sealing parts 35*c* are provided and the outer peripheral surface of the turbine rotor 20.

[D] Regarding the Temperature of the Cooling Medium CF (Cooling Temperature) and the Flow Rate of the Cooling Medium CF (Cooling Flow Rate)

Figure 7:
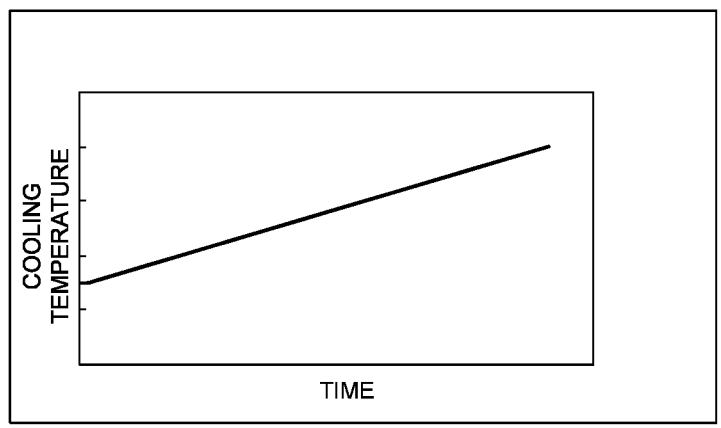
FIG. 7 is a view illustrating the relationship between a temperature of a cooling medium CF (cooling temperature) and a time in the turbine according to the fourth embodiment.
Figure 8:
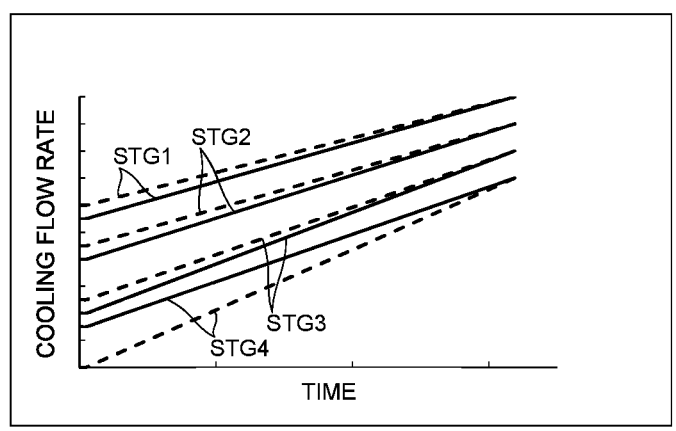
FIG. 8 is a view illustrating the relationship between a flow rate of the cooling medium CF (cooling flow rate) and a time in the turbine according to the fourth embodiment.

FIG. 7 is a view illustrating the relationship between a temperature of the cooling medium CF (cooling temperature) and a time. FIG. 8 is a view illustrating the relationship between a flow rate of the cooling medium CF (cooling flow rate) and a time.

FIG. 7 and FIG. 8 each illustrate the above-described turbine 10 with respect to the period between the time when a startup operation starts and the time when a rated operation starts. FIG. 8 illustrates flow rates of the cooling medium CF supplied to the plural (four) turbine stages respectively, "STG1" indicates the case of the first-stage (initial-stage) turbine stage 40, "STG2" indicates the case of the second-stage turbine stage 40, "STG3" indicates the third-stage turbine stage 40, and "STG4" indicates the fourth-stage (final-stage) turbine stage 40. Further, in FIG. 8, the case of the turbine 10 in this embodiment is illustrated by a "solid line," and unlike the turbine 10 in this embodiment, the case of the related art with no installation of the throttle mechanism 50*a* is illustrated by a "broken line."

As illustrated in FIG. 7, the temperature of the cooling medium CF (cooling temperature) rises with the passage of time proportionally, for example in this embodiment. In other words, the temperature of the cooling medium CF (cooling temperature) rises linearly during the period from the start of startup to the start of rated operation. In order to increase the cooling temperature, ignition of the combustor 81 (see FIG. 4) is performed.

As illustrated by the broken lines in FIG. 8, in the case of the related art with no installation of the throttle mechanism 50*a*, which is different from the turbine 10 in this embodiment, the flow rate of the cooling medium CF supplied to each of the plural (four) turbine stages 40 (cooling flow rate) increases with the passage of time because the pressure at a turbine inlet increases. The flow rate at which the cooling medium CF flows to each of the plural (four) turbine stages 40 at the beginning of startup (left side in FIG. 8) decreases as the position of the turbine stage 40 shifts from the upstream side to the downstream side. The rate at which the flow rate of the cooling medium CF increases with time increases as the position of the turbine stage 40 shifts from the upstream side to the downstream side. A blade surface heat transfer coefficient is small at the beginning of startup (left side in FIG. 8), and thus, the flow rate of the cooling medium CF (cooling flow rate) may be small. However, at the beginning of startup (left side in FIG. 8), the flow rate of the cooling medium CF may be insufficient because of a small differential pressure between the working medium and the cooling medium CF in the turbine stage 40 of the fourth stage STG4 (final stage), as described above.

As illustrated by the solid lines in FIG. 8, even in the case of this turbine 10 in this embodiment, the flow rate of the cooling medium CF supplied to each of the plural (four) turbine stages 40 at the start of rated operation (right side in FIG. 8) (cooling flow rate) is the same as in the case of the related art.

In the turbine 10 in this embodiment, the throttle mechanisms 50*a* are installed. As described above, the throttle mechanism 50*a* is installed at the third rotor cooling flow path part H213 and the second inner casing cooling medium flow path part H312 intended for introducing the cooling medium into the turbine stage 40 of the fourth stage STG4 (final stage). The throttle mechanism 50*a* is configured to make the cross-sectional areas of the third rotor cooling flow path part H213 and the second inner casing cooling medium flow path part H312 (second cooling medium flow path part) small as temperature rises. As illustrated in FIG. 7, the temperature of the cooling medium CF (cooling temperature) rises with the passage of time, and thus, the pressure loss increases with the passage of time in the throttle mechanism 50*a*. Therefore, the throttle mechanism 50*a* makes the cross-sectional area of the flow path through which the cooling medium CF flows larger at the beginning of startup (left side in FIG. 8) than at the start of rated operation (right side in FIG. 8).

As illustrated by the solid line in FIG. 8, in the case of the turbine 10 in this embodiment, the flow rate of the cooling medium CF to be introduced into the turbine stage 40 of the fourth stage STG4 (final stage) at the beginning of startup (cooling flow rate) increases as compared to the related art. Therefore, the flow rate of the cooling medium CF to be introduced into the turbine stage 40 located on the upstream side (STG1 to STG3) from the fourth stage STG4 (final stage) at the beginning of startup decreases as compared to the related art.

As a result, the rate at which the flow rate of the cooling medium CF to be introduced into the turbine stage 40 of the fourth stage STG4 (final stage) increases according to time is lower in this embodiment than in the related art. In contrast to this, the rate at which the flow rate of the cooling medium CF to be introduced into another turbine stage 40 increases according to time is larger in this embodiment than in the related art.

[E] Summary

As described above, in this embodiment, the throttle mechanism 50a is not installed at the cooling medium flow path intended for introducing the cooling medium CF into the turbine stage 40 on the upstream side from the final stage, but at the cooling medium flow path intended for introducing the cooling medium CF into the final-stage turbine stage 40, the throttle mechanism 50a is installed. The throttle mechanism 50a is configured to make the cross-sectional area of the cooling medium flow path small as temperature rises. Therefore, in this embodiment, as described above, the cooling medium CF can be sufficiently introduced into the final-stage turbine stage 40 during the period from the beginning of startup to the start of rated operation. Further, in this embodiment, it is possible to perform an autonomous adjustment with the temperature of fluid without external access or adjustment.

[F] Modified Example

In the above-described embodiment, the throttle mechanism 50a is not installed at the third rotor cooling flow path part H213 (first cooling medium flow path part) intended for introducing the cooling medium into the turbine stage 40 on the upstream side Us side from the final-stage turbine stage 40 out of a plurality of the third rotor cooling flow path parts H213. Further, the throttle mechanism 50a is not installed at the second inner casing cooling medium flow path part H312 (first cooling medium flow path part) intended for introducing the cooling medium into the turbine stage 40 on the upstream side Us side from the final-stage turbine stage 40 out of a plurality of the second inner casing cooling medium flow path parts H312 constituting the inner casing cooling medium flow path H31. However, the present invention is not limited to this. The throttle mechanism 50a may be installed also at the cooling medium flow path with no installation of the throttle mechanism 50a in the above-described embodiment as necessary.

Further, in the above-described embodiment, there has been explained the case where the third rotor cooling flow path part H213 has one end thereof, which is located on the inner side in the radial direction, communicating with the second rotor cooling flow path part H212 and has the other end thereof, which is located on the outer side in the radial direction, communicating with the space located between the inner peripheral surface of the heat insulating plate 71 and the outer peripheral surface of the turbine rotor 20. However, the present invention is not limited to this. Of the third rotor cooling flow path part H213, the other end located on the outer side in the radial direction may directly communicate with a cooling flow path inside the rotor blade 42.

Further, in the above-described embodiment, there has been explained the case where the throttle mechanisms 50a having the same configuration are installed at the third rotor cooling flow path part H213 and the second inner casing cooling medium flow path part H312 (second cooling medium flow path part). However, the present invention is not limited to this. As a matter of course, the throttle mechanisms 50a having different configurations may be installed at the third rotor cooling flow path part H213 and the second inner casing cooling medium flow path part H312 (second cooling medium flow path part) as necessary.

Fifth Embodiment

[A] Configuration of the Turbine 10

Figure 9:
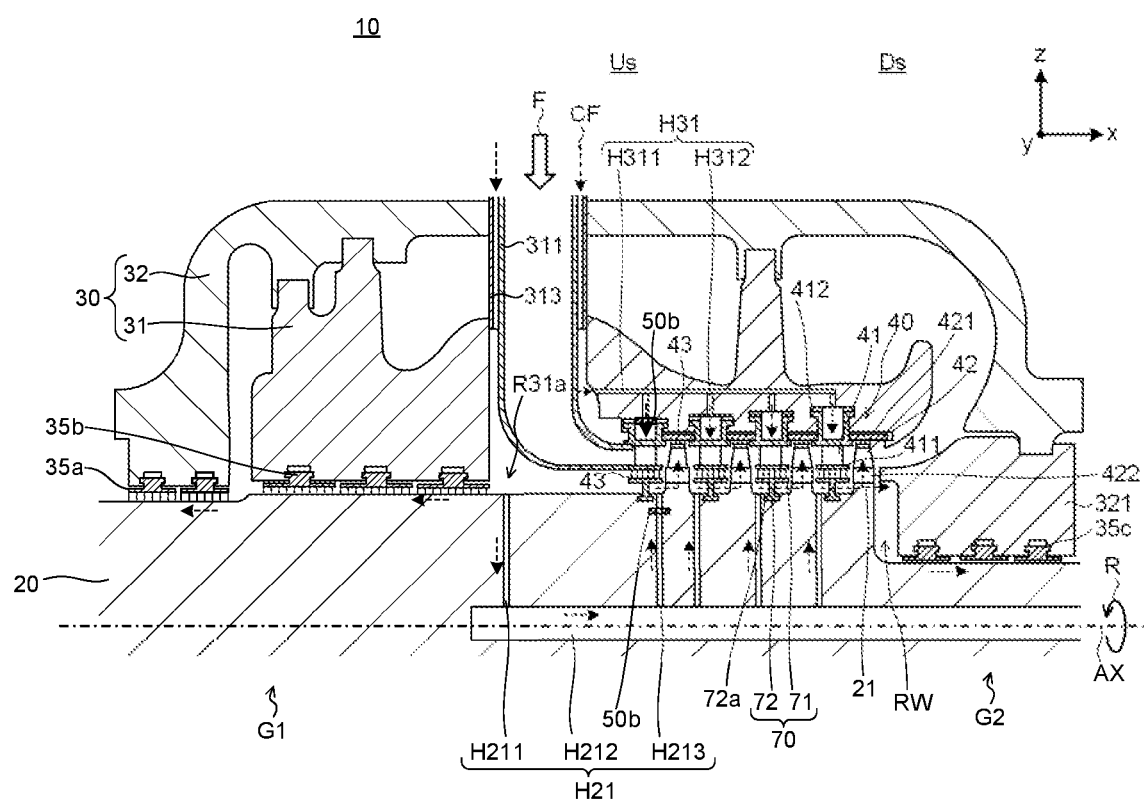
FIG. 9 is a cross-sectional view schematically illustrating a partial cross section of a turbine according to a fifth embodiment.

There is explained one example of a turbine 10 according to a fifth embodiment using FIG. 9.

FIG. 9 schematically illustrates a partial cross section of the turbine 10 as in FIG. 6.

In the turbine 10 in this embodiment, throttle mechanisms 50b are provided. The throttle mechanisms 50b are installed at positions different from those of the throttle mechanisms 50a in the fourth embodiment. Except for this and related points, this embodiment is the same as the fourth embodiment. Therefore, the explanations of overlapping matters will be omitted as appropriate.

In this embodiment, the throttle mechanism 50b is not installed at the third rotor cooling flow path part H213 (first cooling medium flow path) intended for introducing the cooling medium into the turbine stage 40 on the downstream side DS side from the initial-stage (first-stage) turbine stage 40 out of a plurality of the third rotor cooling flow path parts H213 constituting the rotor cooling flow path H21. The throttle mechanism 50b is installed at the third rotor cooling flow path part H213 (second cooling medium flow path) intended for introducing the cooling medium into the initial-stage turbine stage 40 out of a plurality of the third rotor cooling flow path parts H213.

Further, the throttle mechanism 50b is not installed at the second inner casing cooling medium flow path part H312 (first cooling medium flow path) intended for introducing the cooling medium into the turbine stage 40 on the downstream side Ds side from the initial-stage (first-stage) turbine stage 40 out of a plurality of the second inner casing cooling medium flow path parts H312 constituting the inner casing cooling medium flow path H31. The throttle mechanism 50b is installed at the second inner casing cooling medium flow path part H312 (second cooling medium flow path) intended for introducing the cooling medium into the initial-stage turbine stage 40 out of a plurality of the second inner casing cooling medium flow path parts H312.

The throttle mechanism 50b has the same configuration as that of the throttle mechanism 50 in the first embodiment, for example, and is configured to make the cross-sectional areas of the third rotor cooling flow path part H213 and the second inner casing cooling medium flow path part H312 intended for introducing the cooling medium into the initial-stage (first-stage) turbine stage 40 large. The throttle mechanism 50b may have the same configuration as that of the throttle mechanism 50 in the second embodiment or the third embodiment.

[B] Regarding the Flow Rate of the Cooling Medium CF (Cooling Flow Rate)

Figure 10:
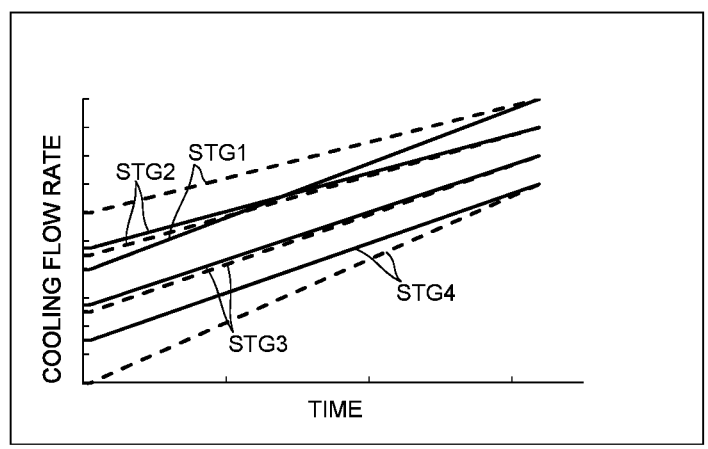
FIG. 10 is a view illustrating the relationship between a flow rate of the cooling medium CF (cooling flow rate) and a time in the turbine according to the fifth embodiment.

FIG. 10 is a view illustrating the relationship between a flow rate of the cooling medium CF (cooling flow rate) and a time in the turbine according to the fifth embodiment.

Similarly to FIG. 8, FIG. 10 illustrates flow rates of the cooling medium CF supplied to the plural (four) turbine stages respectively, "STG1" indicates the case of the first-stage (initial-stage) turbine stage 40, "STG2" indicates the case of the second-stage turbine stage 40, "STG3" indicates the third-stage turbine stage 40, and "STG4" indicates the fourth-stage (final-stage) turbine stage 40. Further, in FIG. 10, similarly to FIG. 8, the case of the turbine 10 in this embodiment is illustrated by a "solid line," and unlike the turbine 10 in this embodiment, the case of the related art with no installation of the throttle mechanism 50b is illustrated by a "broken line."

As illustrated by the solid lines in FIG. 10, even in the case of the turbine 10 in this embodiment, the flow rate of the cooling medium CF supplied to each of the plural (four) turbine stages 40 at the start of rated operation (cooling flow rate) (right side in FIG. 10) is the same as in the case of the related art.

In the turbine 10 in this embodiment, the throttle mechanisms 50b are installed. As described above, the throttle mechanism 50b is installed at the third rotor cooling flow path part H213 and the second inner casing cooling medium flow path part H312 intended for introducing the cooling medium into the turbine stage 40 of the first stage STG4 (initial stage). The throttle mechanism 50b is configured to make the cross-sectional areas of the third rotor cooling flow path part H213 and the second inner casing cooling medium flow path part H312 (second cooling medium flow path part) large as temperature rises. As illustrated in FIG. 7, the temperature of the cooling medium CF (cooling temperature) rises with the passage of time, and thus, the pressure loss in the throttle mechanism 50b decreases with the passage of time. Therefore, the throttle mechanism 50b makes the cross-sectional area of the flow path through which the cooling medium CF flows smaller at the beginning of startup (left side in FIG. 10) than at the start of rated operation (right side in FIG. 10).

As illustrated by the solid line in FIG. 10, in the case of the turbine 10 in this embodiment, the flow rate of the cooling medium CF to be introduced into the turbine stage 40 of the first stage STG1 (initial stage) at the beginning of startup (cooling flow rate) decreases as compared to the related art. Therefore, the flow rate of the cooling medium CF to be introduced into the turbine stage 40 located on the downstream side (STG2 to STG4) from the first stage STG1 (initial stage) at the beginning of startup increases as compared to the related art.

As a result, the rate at which the flow rate of the cooling medium CF to be introduced into the turbine stage 40 of the first stage STG1 (initial stage) increases according to time is higher in this embodiment than in the related art. In contrast to this, the rate at which the flow rate of the cooling medium CF to be introduced into another turbine stage 40 increases according to time is smaller in this embodiment than in the related art.

[C] Summary

As described above, in this embodiment, the throttle mechanism 50b is not installed at the cooling medium flow path intended for introducing the cooling medium CF into the turbine stage 40 on the downstream side from the initial stage, but at the cooling medium flow path intended for introducing the cooling medium CF into the initial-stage turbine stage 40, the throttle mechanism 50b is installed. The throttle mechanism 50b is configured to make the cross-sectional area of the cooling medium flow path large as temperature rises. Therefore, in this embodiment, the cooling medium CF can be sufficiently introduced into the final-stage turbine stage 40 during the period from the beginning of startup to the start of rated operation. Further, in this embodiment, it is possible to perform an autonomous adjustment with the temperature of fluid without external access or adjustment.

Sixth Embodiment

[A] Configuration of the Turbine 10

Figure 11:
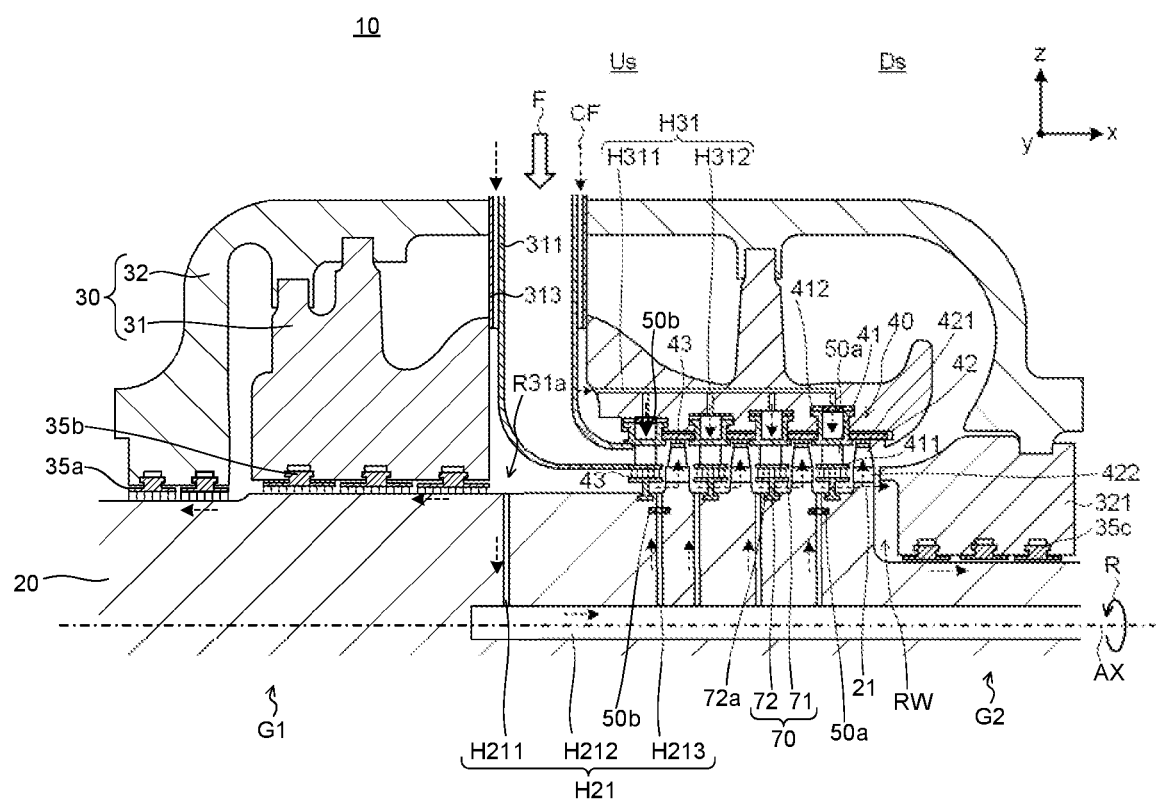
FIG. 11 is a cross-sectional view schematically illustrating a partial cross section of a turbine according to a sixth embodiment.

There is explained an example of a turbine 10 according to a sixth embodiment using FIG. 11.

FIG. 11 schematically illustrates a partial cross section of the turbine 10 similarly to FIG. 6 and FIG. 9.

In the turbine 10 in this embodiment, in addition to the throttle mechanism 50a, the throttle mechanism 50b is provided. Except for this and related points, this embodiment is the same as the fourth embodiment (see FIG. 6) and the fifth embodiment (see FIG. 9). Therefore, the explanations of overlapping matters will be omitted as appropriate.

In this embodiment, the throttle mechanisms 50a are installed in the same manner as in the fourth embodiment (see FIG. 6). Specifically, the throttle mechanism 50a is installed at the third rotor cooling flow path part H213 (second cooling medium flow path part) intended for introducing the cooling medium into the final-stage turbine stage 40 out of a plurality of the third rotor cooling flow path parts H213. Further, the throttle mechanism 50a is installed at the second inner casing cooling medium flow path part H312 (second cooling medium flow path part) intended for introducing the cooling medium into the final-stage turbine stage 40 out of a plurality of the second inner casing cooling medium flow path parts H312. The throttle mechanism 50a is configured to make the cross-sectional areas of the third rotor cooling flow path part H213 and the second inner casing cooling medium flow path part H312 (second cooling medium flow path part) intended for introducing the cooling medium into the final-stage turbine stage 40 small.

In this embodiment, the throttle mechanisms 50b are installed in the same manner as in the fifth embodiment (see FIG. 9). That is, the throttle mechanism 50b is installed at the third rotor cooling flow path part H213 (second cooling medium flow path part) intended for introducing the cooling medium into the initial-stage turbine stage 40 out of a plurality of the third rotor cooling flow path parts H213. Further, the throttle mechanism 50b is installed at the second inner casing cooling medium flow path part H312 (second cooling medium flow path part) intended for introducing the cooling medium into the initial-stage turbine stage 40 out of a plurality of the second inner casing cooling medium flow path parts H312. The throttle mechanism 50b is configured to make the cross-sectional areas of the third rotor cooling flow path part H213 and the second inner casing cooling medium flow path part H312 (second cooling medium flow path part) intended for introducing the cooling medium into the final-stage turbine stage 40 large.

[B] Regarding the Flow Rate of the Cooling Medium CF (Cooling Flow Rate)

Figure 12:
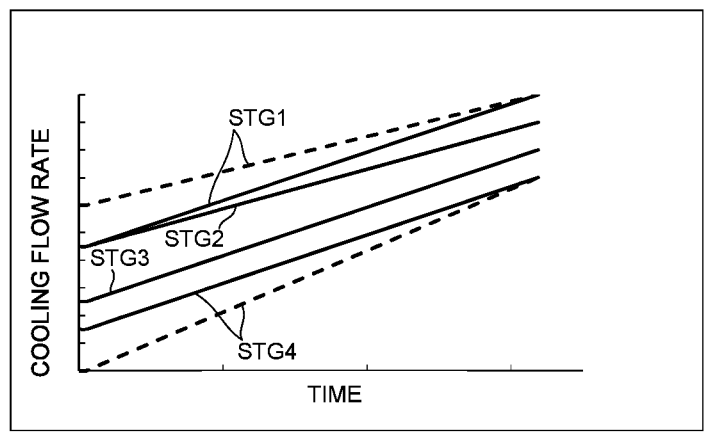
FIG. 12 is a view illustrating the relationship between a flow rate of the cooling medium CF (cooling flow rate) and a time in the turbine according to the sixth embodiment.

FIG. 12 is a view illustrating the relationship between a flow rate of the cooling medium CF (cooling flow rate) and a time in the turbine according to the sixth embodiment.

Similarly to FIG. 8 and FIG. 10, FIG. 12 illustrates flow rates of the cooling medium CF supplied to the plural (four) turbine stages respectively, "STG1" indicates the case of the first-stage (initial-stage) turbine stage 40, "STG2" indicates the case of the second-stage turbine stage 40, "STG3" indicates the third-stage turbine stage 40, and "STG4" indicates the fourth-stage (final-stage) turbine stage 40. Further, in FIG. 12, similarly to FIG. 8 and FIG. 10, the case of the turbine 10 in this embodiment is illustrated by a "solid line," and unlike the turbine 10 in this embodiment, the case of the related art with no installation of the throttle mechanism 50b is illustrated by a "broken line."

As illustrated by the solid lines in FIG. 12, even in the case of the turbine 10 in this embodiment, the flow rate of the cooling medium CF supplied to each of the plural (four)

turbine stages 40 at the start of rated operation (cooling flow rate) (right side in FIG. 12) is the same as in the case of the related art.

In the turbine 10 in this embodiment, the throttle mechanism 50a and the throttle mechanism 50b are installed. As described above, the throttle mechanism 50a makes the cross-sectional area of the flow path through which the cooling medium CF flows larger at the beginning of startup (left side in FIG. 12) than at the start of rated operation (right side in FIG. 12). In contrast to this, the throttle mechanism 50b makes the cross-sectional area of the flow path through which the cooling medium CF flows smaller at the beginning of startup (left side in FIG. 12) than at the start of rated operation (right side in FIG. 12).

In this embodiment, the flow rate of the cooling medium CF to be introduced into the turbine stage 40 of the fourth stage STG4 (final stage) at the beginning of startup (cooling flow rate) increases as compared to the related art due to the function of the throttle mechanism 50a as in the fourth embodiment.

Further, in this embodiment, the flow rate of the cooling medium CF to be introduced into the turbine stage 40 of the first stage STG1 (initial stage) at the beginning of startup (cooling flow rate) decreases as compared to the related art due to the function of the throttle mechanism 50b as in the fifth embodiment. Therefore, the flow rate of the cooling medium CF to be introduced into the turbine stage 40 located on the downstream side stage (STG2 to STG4) from the first stage STG1 (initial stage) at the beginning of startup increases as compared to the related art.

As a result, in this embodiment, the flow rate of the cooling medium CF to be introduced into the turbine stage 40 of the fourth stage STG4 (final stage) at the beginning of startup (cooling flow rate) increases as compared to the fourth embodiment and the fifth embodiment due to the functions of the throttle mechanism 50a and the throttle mechanism 50b.

[C] Summary

As described above, in this embodiment, at the cooling medium flow path intended for introducing the cooling medium CF into the final-stage turbine stage 40, the throttle mechanism 50a is installed, and at the cooling medium flow path intended for introducing the cooling medium CF into the initial-stage turbine stage 40, the throttle mechanism 50b is installed. The throttle mechanism 50a is configured to make the cross-sectional area of the cooling medium flow path small as temperature rises. The throttle mechanism 50b is configured to make the cross-sectional area of the cooling medium flow path large as temperature rises. Therefore, in this embodiment, as described above, the cooling medium CF can be sufficiently introduced into the final-stage turbine stage 40 during the period from the beginning of startup to the start of rated operation. Further, in this embodiment, it is possible to perform an autonomous adjustment with the temperature of fluid without external access or adjustment.

<Others>

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the above-described embodiments, there has been explained the case where the throttle mechanism 50 (50a, 50b) is installed in the turbine 10 being the $CO_2$ turbine into which a supercritical working medium (working $CO_2$ medium) is introduced, but the present invention is not limited to this. The throttle mechanism 50 (50a, 50b) may be installed in the turbine 10 into which another medium is introduced as the working medium as necessary.

REFERENCE SINGS LIST

10 . . . turbine, 11 . . . power generator, 12 . . . turbine, 20 . . . turbine rotor, 21 . . . rotor wheel, 30 . . . turbine casing, 31 . . . inner casing, 32 . . . outer casing, 35a . . . gland sealing part, 35b . . . gland sealing part, 35c . . . gland sealing part, 40 . . . turbine stage, 41 . . . stator blade, 42 . . . rotor blade, 43 . . . seal fin, 70 . . . heat insulating piece, 71 . . . heat insulating plate, 72 . . . leg part, 72a . . . engagement part, 80 . . . oxygen generator, 81 . . . combustor, 82 . . . regenerative heat exchanger, 83 . . . cooler, 85 . . . moisture separator, 86 . . . $CO_2$ pump, 90 . . . exhaust pipe, 311 . . . transition piece, 313 . . . cooling medium introduction pipe, 321 . . . packing head, 411 . . . inner shroud, 412 . . . outer shroud, 421 . . . shroud segment, 422 . . . implanted part, 811 . . . combustor casing, AX . . . rotation center axis, CF . . . cooling medium, Ds . . . downstream side, F . . . working medium, G1 . . . upstream-side gland part, G2 . . . downstream-side gland part, H21 . . . rotor cooling flow path, H211 . . . first rotor cooling flow path part, H212 . . . second rotor cooling flow path part, H213 . . . third rotor cooling flow path part, H31 . . . inner casing cooling medium flow path, H311 . . . first inner casing cooling medium flow path part, H312 . . . second inner casing cooling medium flow path part, R . . . rotation direction, R31a . . . cooling chamber, RW . . . final-stage wheel space, Us . . . upstream side, 50 . . . throttle mechanism, 51 . . . pipe-shaped member, 52 . . . rod-shaped member, 53 . . . support member, SP51 . . . internal space, 61 . . . first flow path forming member, 62 . . . second flow path forming member, 63 . . . biasing member, H61 . . . first through hole, H62 . . . second through hole, T61 . . . trench, 631 . . . first biasing member, 632 . . . second biasing member

What is claimed is:

1. A throttle mechanism for controlling a flow rate of a fluid flowing through a flow path, comprising:
   a first flow path forming member in which a first through hole forming the flow path and a trench communicating with the first through hole are formed;
   a second flow path forming member in which a second through hole forming the flow path is formed, the second flow path forming member movably installed inside the trench; and
   a biasing member biasing the second flow path forming member in a moving direction of the second flow path forming member inside the trench, wherein
   the biasing member includes:
   a first biasing member installed on one side in the moving direction inside the trench; and
   a second biasing member installed on the other side in the moving direction inside the trench,
   a material that forms the first biasing member and a material that forms the second biasing member are different from each other in the tendency that a Young's modulus changes according to temperature, and
   the throttle mechanism is configured to make the cross-sectional area of the flow path change by an overlapping portion of the first through hole and the second through hole varying in size as the second biasing member moves inside the trench according to temperature.

\* \* \* \* \*